(12) United States Patent
Moriyama

(10) Patent No.: US 12,017,481 B2
(45) Date of Patent: Jun. 25, 2024

(54) TIRE COMPRISING A TREAD

(71) Applicant: COMPAGNIE GENERALE DES ETABLISSEMENTS MICHELIN, Clermont-Ferrand (FR)

(72) Inventor: Masahiko Moriyama, Tokyo (JP)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 364 days.

(21) Appl. No.: 16/627,610

(22) PCT Filed: Jun. 29, 2018

(86) PCT No.: PCT/JP2018/024752
§ 371 (c)(1),
(2) Date: Dec. 30, 2019

(87) PCT Pub. No.: WO2019/004411
PCT Pub. Date: Jan. 3, 2019

(65) Prior Publication Data
US 2020/0139761 A1 May 7, 2020

(30) Foreign Application Priority Data

Jun. 30, 2017 (WO) .................. PCT/JP2017/024082

(51) Int. Cl.
*B60C 11/00* (2006.01)
*B29D 30/06* (2006.01)
(Continued)

(52) U.S. Cl.
CPC ...... *B60C 11/0041* (2013.01); *B29D 30/0662* (2013.01); *B60C 1/0016* (2013.01);
(Continued)

(58) Field of Classification Search
CPC ... B60C 1/0016; B60C 11/00; B60C 11/0008; B60C 11/0041; B60C 11/005; B60C 11/1346
(Continued)

(56) References Cited

U.S. PATENT DOCUMENTS 5,830,930 A   11/1998   Mahmud et al.
6,414,061 B1   7/2002   Cruse et al.
(Continued)

FOREIGN PATENT DOCUMENTS

EP   0 510 550 A1   10/1992
EP   3 031 620 A1   6/2016
(Continued)

OTHER PUBLICATIONS

Chika Ochiai, WO-2015090976-A1, machine translation. (Year: 2015).*

(Continued)

*Primary Examiner* — Sedef E Paquette
(74) *Attorney, Agent, or Firm* — VENABLE LLP

(57) ABSTRACT

A tire comprises a tread which comprises a plurality of tread pattern elements (1) delimited by cut-outs (3, 4), the tread pattern elements respectively comprising at least one lateral face (13, 14, 15, 16), and a first rubber composition (FC) at least partially covered on at least one of the lateral face (13, 14, 15, 16) with a layer of a second rubber composition (SC) based on an elastomer matrix comprising more than 55 phr and up to 100 phr of a first diene elastomer having a glass transition temperature of less than −25° C. and 0 to less than 45 phr of a second diene elastomer, a reinforcing filler comprising more than 100 phr of a reinforcing inorganic filler, and more than 45 phr of a plasticizing agent predominately comprising at least one hydrocarbon resin having a glass transition temperature of more than 20° C.

16 Claims, 1 Drawing Sheet

(51) Int. Cl.
  *B60C 1/00* (2006.01)
  *B60C 9/00* (2006.01)
  *B60C 11/13* (2006.01)
  *B29D 30/38* (2006.01)

(52) U.S. Cl.
  CPC ............ *B60C 9/0042* (2013.01); *B60C 9/005* (2013.01); *B60C 11/1346* (2013.01); *B29D 2030/383* (2013.01)

(58) Field of Classification Search
  USPC .......................................... 152/209.1, 209.5
  See application file for complete search history.

(56) References Cited

U.S. PATENT DOCUMENTS

| | | | |
|---|---|---|---|
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 2004/0051210 | A1 | 3/2004 | Tardivat et al. |
| 2004/0127617 | A1 | 7/2004 | Vasseur et al. |
| 2004/0129360 | A1 | 7/2004 | Vidal |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2005/0245753 | A1 | 11/2005 | Cruse et al. |
| 2007/0221304 | A1 | 9/2007 | Boiocchi et al. |
| 2007/0228322 | A1 | 10/2007 | Chaves et al. |
| 2008/0041508 | A1 | 2/2008 | Cambon et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2010/0145089 | A1 | 6/2010 | Mignani et al. |
| 2010/0154948 | A1* | 6/2010 | Dahlberg ............ B60C 11/1346 152/209.4 |
| 2011/0294953 | A1 | 12/2011 | Seeboth et al. |
| 2014/0311641 | A1 | 10/2014 | El-Harak et al. |
| 2015/0343843 | A1* | 12/2015 | Cato .................. C08K 3/06 524/526 |
| 2016/0159157 | A1 | 6/2016 | Jacoby et al. |
| 2019/0299714 | A1 | 10/2019 | Moriyama |

FOREIGN PATENT DOCUMENTS

| | | | |
|---|---|---|---|
| JP | 2009-126314 A | | 6/2009 |
| JP | 2010105509 A | * | 5/2010 ......... B60C 11/1346 |
| WO | 96/37547 A2 | | 11/1996 |
| WO | 99/09036 A1 | | 2/1999 |
| WO | 99/28380 A1 | | 6/1999 |
| WO | 02/30939 A1 | | 4/2002 |
| WO | 02/31041 A1 | | 4/2002 |
| WO | 02/083782 A1 | | 10/2002 |
| WO | 02/088238 A1 | | 11/2002 |
| WO | 03/002648 A1 | | 1/2003 |
| WO | 03/002649 A1 | | 1/2003 |
| WO | 03/016387 A1 | | 2/2003 |
| WO | 2004/033548 A1 | | 4/2004 |
| WO | 2005/063508 A1 | | 7/2005 |
| WO | 2006/023815 A2 | | 3/2006 |
| WO | 2006/125532 A1 | | 11/2006 |
| WO | 2006/125533 A1 | | 11/2006 |
| WO | 2006/125534 A1 | | 11/2006 |
| WO | 2007/098080 A2 | | 8/2007 |
| WO | 2008/055986 A1 | | 5/2008 |
| WO | 2010/072685 A1 | | 7/2010 |
| WO | 2013/087878 A1 | | 6/2013 |
| WO | 2015/090976 A1 | | 6/2015 |

OTHER PUBLICATIONS

Masakazu Takeuchi, JP-2010105509-A, machine translation. (Year: 2010).*
International Search Report dated Sep. 13, 2018, in corresponding PCT/JP2018/024752 (2 pages).
International Search Report and Written Opinion dated Sep. 25, 2017, in priority application PCT/JP2017/024082 (10 pages).
S. Brunauer, et al., "Adsorption of Gases in Multimolecular Layers", J. Am. Chem. Soc., vol. 60, pp. 309-319 (1938).

* cited by examiner

[Fig. 1]
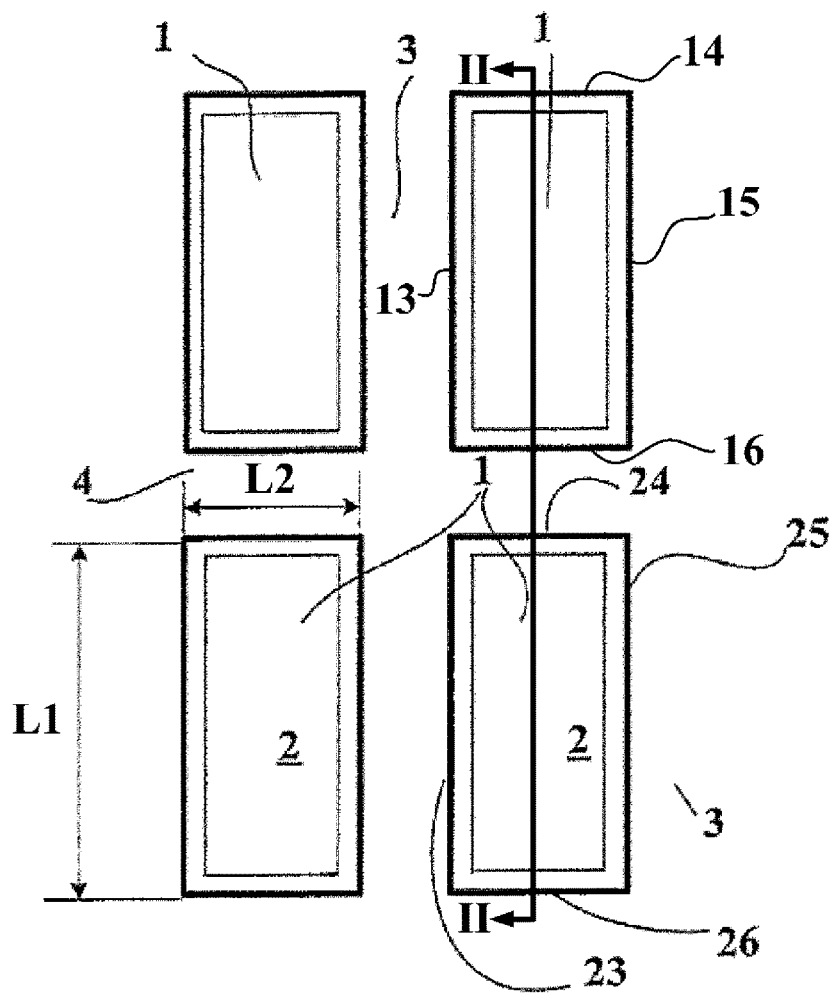
[Fig. 2]
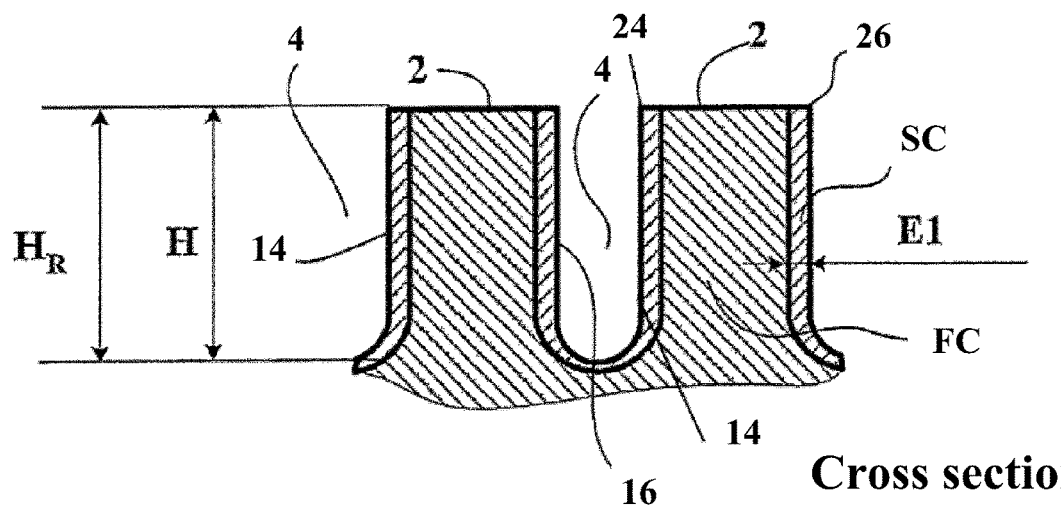
Cross section II-II

TIRE COMPRISING A TREAD

TECHNICAL FIELD

The field of the invention is that of rubber compositions for tire treads, more precisely rubber compositions for tire treads suitable for snow tires or winter tires capable of rolling over ground surfaces covered with snow.

As is known, the snow tires classified in a category of use "snow", identified by an inscription the alpine symbol ("3-peak-mountain with snowflake"), marked on their sidewalls, mean tires whose tread patterns, tread compounds and/or structures are primarily designed to achieve, in snow conditions, a performance better than that of normal tires intended for normal on-road use with regard to their abilities to initiate, maintain or stop vehicle motion.

BACKGROUND ART

In order to obtain satisfactory driving performance particularly on wet, snow-covered (snowy) or icy road surfaces, it is a known practice to provide a tire comprising a tread that comprises tread pattern elements delimited by cut-outs (grooves with an average width of greater than or equal to 2 mm and/or sipes (incisions), with an average width of less than 2 mm), these cut-outs being obtained for example by molding. The tread pattern elements comprise a contact surface intended to come into contact with the ground during rolling, lateral faces and delimiting cut-outs (especially, sipes); each intersection of each lateral face with the contact surface forms an edge corner which fa-cilitates contact between the tire and the ground.

There are generally two types of the tread pattern elements. One is called as "block(s)" delimited by circumferential or axial groove(s), and the axial groove(s) is open to both sides of the circumferential grooves. Another is called as "rib(s)" delimited by circumferential groove(s) (optionally, and axial one(s)), and the axial groove(s) is not open to both sides of the circumferential grooves. Moreover, the tread pattern elements may comprise one or more sipes to form additional edge corners.

CITATION LIST

Patent Literature

PTL 1: WO2013/087878

Generally, it is well known that rubber compositions of the tread, especially the edge corner(s), of the tire has a significant effect on tire grip performance on ground, particularly wet, snowy and/or icy ground(s). Thus, the patent application (Patent literature 1) filed by the present applicants, discloses a winter type tire particularly well suited to travel on snowy road, and the tread pattern elements respectively comprising at least one lateral face and a contact surface intended to come into contact with the ground during rolling, wherein the tread pattern elements comprise a base rubber composition (FC: a first rubber composition) at least partially covered on at least one of the lateral face with a layer of a covering composition (SC: a second rubber composition) which is different from the first rubber composition and which comprises a specific formulation (for instance, a composition having a high glass transition temperature, or comprising high filler content or comprising high sulphur content) able to give such very rigid covering layer after vulcanization of the tire, and these tread pattern elements placed are favorable the grip on snowy ground.

However, it is always desirable for the skilled person to improve grip on wet ground with maintaining or improving the grips on snowy and icy grounds.

SUMMARY OF INVENTION

Technical Problem

During their research, the inventor has discovered that a specific covering composition allows an unexpectedly improved grip on wet ground, while maintaining or improving the grips on snowy and icy grounds.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

As a tire has a geometry of revolution about an axis of rotation, the geometry of the tire is generally described in a meridian plane containing the axis of rotation of the tire, and the following definitions of directions of the tire are understood in the present application:

A radial direction is a direction perpendicular to the axis of rotation of the tire;
An axial direction is a direction parallel to the axis of rotation of the tire;
A circumferential direction is a direction perpendicular to the meridian plane.

A plane being perpendicular to the axis of rotation of the tire and passing through the middle of a tread surface of the tire is referred to as an equatorial plane of the tire.

In what follows, expressions "radially", "axially" and "circumferentially" respectively mean "in the radial direction", "in the axial direction" and "in the circumferential direction". Expressions "radially on the inside (radially inner or radially internal), or respectively radially on the outside (radially outer or radially external)" mean "closer or, respectively, further away, from the axis of rotation of the tire, in the radial direction, than". Expressions "axially on the inside (axially inner or axially interior) or respectively axially on the outside (axially outer or axially exterior)" mean "closer or, respectively further away, from the equatorial plane, in the axial direction, than". Respective dimensions of a given element in the radial, axial and circumferential directions will also be denoted "radial thickness or height", "axial width" and "circumferential length" of this element. Expression "laterally" means "in the circumferential or axial direction".

Solution to Problem

A first aspect of the invention is a tire comprising a tread which comprises a plurality of tread pattern elements (1) delimited by cut-outs (3, 4);

the tread pattern elements (1) respectively comprising at least one lateral face (13, 14, 15, 16) and a contact surface (2) intended to come into contact with the ground during rolling;

the tread pattern elements (1) respectively comprising a first rubber composition (FC) at least partially covered on at least one of the lateral face (13, 14, 15, 16) with a layer of a second rubber composition (SC) which is different from the first rubber composition (FC), the tire, being characterized in that the second rubber composition (SC) is based on:

- an elastomer matrix comprising more than 55 phr and up to 100 phr of a first diene elastomer having a glass transition temperature ($Tg_{DSC}$) of less than −25° C. (for example, between −125° C. and −25° C.), preferably less than −30° C. (for example, between −120° C. and −30° C.), and 0 to less than 45 phr of a second diene elastomer;
- a reinforcing filler comprising more than 100 phr, for example, between 100 and 200 phr, preferably between 100 and 190 phr, more preferably between 100 and 180 phr, still more preferably between 100 and 170 phr, particularly between 100 and 160 phr, more particularly between 100 and 150 phr, still more particularly between 100 and 140 phr, of a reinforcing inorganic filler; and
- more than 45 phr of a plasticizing agent predominantly comprising at least one hydrocarbon resin having a glass transition temperature ($Tg_{DSC}$) of more than 20° C. (for example, between 20° C. and 100° C.), preferably more than 30° C. (for example, between 30° C. and 100° C.), more preferably more than 40° C. (for example, between 40° C. and 100° C.), still more preferably more than 45° C. (for example, between 45° C. and 100° C.), particularly at least 50° C. (for example, at least 50° C. and less than 100° C.).

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Advantageous Effects of Invention

The specific covering composition allows unexpectedly improved the grip performance of the tire on wet ground, while maintaining or improving the grips on snowy and icy grounds.

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

BRIEF DESCRIPTION OF DRAWINGS

Other characteristics and advantages of the invention arise from the description made hereafter in reference to the annexed drawings which schematically show (in particular not to a specific scale), as nonrestrictive examples, of the embodiments of the object of the invention.

In these drawings:

FIG. 1 depicts a partial plan view of blocks as tread pattern elements (1) of a tread of a tire according to the invention;

FIG. 2 shows the blocks of FIG. 1 in the cross section on the line of section II-II.

DESCRIPTION OF EMBODIMENTS

The annexed FIG. 1 represents a partial plan view of four rectangular blocks as a plurality of tread pattern elements (1) of a tread of a tire according to the present invention. Each of the blocks is delimited by cut-outs (3, 4). The cut-outs are grooves (3) circumferentially extending and the other grooves (4) axially extending. Each of the blocks comprises four lateral faces (13, 14, 15, 16) and a contact surface (2) intended to come into contact with ground during the tire rolling. Each of the blocks has a length (L1) on a circumferential direction of the tire, and a width (L2) on an axial direction of the tire. Intersections of the lateral faces (13, 14, 15, 16) with the contact surface (2) form four edge corners (23, 24, 25, 26) which play important portions when driving particularly on a slippery road surface, notably through the presence of water, snow or ice.

The annexed FIG. 2 presents the two blocks in the cross section taken along the line of section II-II of the FIG. 1. The cross section is perpendicular to the axial direction of the tire.

In these figures, each of the blocks comprises a first rubber composition (FC: a mixture of base material), completely in this case, covered with a layer of a second rubber composition (SC: a mixture of covering material or a covering composition) on the four lateral faces (13, 14, 15, 16) bounding the grooves (3, 4) circumferentially (3) or axially extending (3, 4). The second rubber composition (SC) is different from the first rubber composition (FC). The layer of the second rubber composition (SC) has a thickness (E1) that is substantially constant (over an entire height (Hr) of covering, in this instance equal to a depth (H) of the grooves). Then, the depth (H) of the grooves is equal to a height of the blocks.

According to a preferred embodiment of the present invention, the lateral faces (14, 16, 24, 26) have orientations which are perpendicular to the circumferential direction of the tire, preferably the layer of the second rubber composition (SC) covers on the lateral faces (14, 16, 24, 26) which have orientations which are perpendicular to the circumferential direction of the tire in order to allow an excellent grip on wet, snowy and icy grounds.

According to a preferred embodiment of the present invention, the second rubber composition (SC) extends, in a new condition of the tire, as far as the edge corners (23, 24, 25, 26) formed by a boundary between the contact surface (2) and the lateral faces (13, 14, 15, 16) of the tread pattern elements (1).

The first rubber composition (FC) can be a conventional rubber composition which may be based on at least one diene elastomer (typically 50 to 100 phr of a diene elastomer selected from the group consisting of natural rubber, synthetic polyisoprenes, polybutadienes, butadiene copolymers, isoprene copolymers and the mixtures thereof, and 0 to 50 phr of another diene elastomer), between 50 and 200 phr of a reinforcing filler (for instance, silica and/or carbon black), more than 30 phr of a plasticizing agent (for instance, liquid plasticizer(s), hydrocarbon resin(s) or the mixtures thereof) and a crosslinking system (not counting other usual additives).

The second rubber composition (SC) is different from the first rubber composition (FC), and is a specific rubber composition which will be described in details below.

The second rubber composition (SC) is based on an elastomer matrix comprising more than 55 phr and up to 100 phr of a first diene elastomer having a glass transition temperature of less than −25° C., and 0 to less than 45 phr of a second diene elastomer which is different from the first diene elastomer, which means the elastomer matrix comprises no second diene elastomer or comprises less than 45 phr.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, divinylbenzene or vinylnaphthalene.

The first diene elastomer may be selected from the group consisting of polybutadienes (BRs), synthetic polyisoprenes (IRs), natural rubber (NR), butadiene copolymers, isoprene copolymers and the mixtures thereof; such copolymers are selected more preferably from the group consisting of butadiene-styrene copolymers (SBRs) and the mixtures thereof.

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution. This elastomer may be coupled and/or star-branched or else functionalized with a coupling and/or star-branching or functionalizing agent.

A second aspect of the invention is the tire according to the first aspect, wherein the second rubber composition (SC) is such that the first diene elastomer is a styrene-butadiene copolymer (SBR), preferably a solution styrene-butadiene copolymer which is a copolymer of butadiene and styrene, prepared in solution.

A third aspect of the invention is the tire according to the second aspect, wherein the second rubber composition (SC) is such the styrene-butadiene copolymer exhibits a styrene unit of less than 28% by weight (for example, between 5 and 28% by weight) per 100% by weight of the styrene-butadiene copolymer, preferably less than 20% by weight (for example, between 10 and 20% by weight). The styrene unit can be determined by $^1H$ NMR method in accordance with ISO 21561.

A fourth aspect of the invention is the tire according to any one of the first to the third aspects, wherein the second rubber composition (SC) is such that the first diene elastomer exhibits the glass transition temperature ($Tg_{DSC}$) of less than −35° C. (for example, between −115° C. and −35° C.), preferably less than −40° C. (for example, between −110° C. and −40° C.), more preferably less than −45° C. (for example, between −105° C. and −45° C.), still more preferably less than −50° C. (for example, between −100° C. and −50° C.), particularly less than −55° C. (for example, between −95° C. and −55° C.), more particularly at most −60° C. (for example, from −90° C. to −60° C.).

A fifth aspect of the invention is the tire according to the first to the fourth aspects, wherein the second rubber composition (SC) is such that the elastomer matrix comprises 60 to 100 phr, preferably 70 to 100 phr, more preferably 80 to 100 phr, still more preferably 90 to 100 phr, particularly 100 phr, of the first diene elastomer and 0 to 40 phr, preferably 0 to 30 phr, more preferably 0 to 20 phr, still more preferably 0 to 10 phr of the second diene elastomer, which means the elastomer matrix comprises no second diene elastomer or comprises at most 40 phr, preferably at most 30 phr, more preferably at most 20 phr, still more preferably 10 phr.

According to a preferred embodiment of the invention, in the second rubber composition (SC), the second diene elastomer may be selected from the group consisting of butadiene copolymers the mixtures thereof, preferably selected from the group consisting of styrene-butadiene copolymers (SBR), butadiene-isoprene copolymers (BIR), styrene-isoprene copolymers (SIR), styrene-butadiene-isoprene copolymers (SBIR) and the mixtures thereof, more preferably selected from the group consisting of styrene-butadiene copolymers (SBR) and the mixtures thereof.

The second rubber composition (SC) is based on a reinforcing filler comprising more than 100 phr of a reinforcing inorganic filler.

The reinforcing filler can reinforce the rubber composition, and may further comprise a reinforcing organic filler (for instance, carbon black).

According to a preferred embodiment of the invention, the reinforcing filler predominately comprise the reinforcing inorganic filler, that means, the reinforcing filler may comprise more than 50% by weight of the reinforcing inorganic filler per 100% of the total reinforcing filler. More preferably, the content of the reinforcing inorganic filler is more than 60% by weight, still more preferably more than 70% by weight, particularly more than 80% by weight, more particularly more than 90% by weight, per 100% of the total reinforcing filler.

A sixth aspect of the invention is the tire according to any one of the first to the fifth aspects, wherein the second rubber composition (SC) is such that the reinforcing filler comprises more than 110 phr, for example between 110 and 200 phr, preferably between 110 and 190 phr, more preferably between 110 and 180 phr, still more preferably between 110 and 170 phr, particularly between 110 and 160 phr, more particularly between 110 and 150 phr, still more particularly between 110 to 140 phr, advantageously between 110 and 130 phr, more advantageously 115 to 125 phr, of the reinforcing inorganic filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an in-termediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

A seventh aspect of the invention is the tire according to any one of the first to the sixth aspects, wherein the second rubber composition (SC) is such that the reinforcing inorganic filler predominately comprises silica, that is, the reinforcing inorganic filler comprises more than 50% by weight of silica per 100% by weight of the reinforcing inorganic filler. Preferably, the reinforcing inorganic filler may comprise 100% by weight, of silica per 100% by weight of the reinforcing inorganic filler. The reinforcing inorganic filler of the reinforcing filler in the second rubber composition (SC) may comprise a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

The reinforcing inorganic filler used, particularly in case of that it is silica, has a BET surface area and a CTAB specific surface area that are advantageously 50 to 350 $m^2/g$, more advantageously 100 to 300 $m^2/g$, still more preferably between 150 and 250 $m^2/g$.

The BET surface area is measured according to a known method, that is, by gas ad-sorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

An eighth aspect of the invention is the tire according to any one of the first to the seventh aspects, wherein the second rubber composition (SC) is such that the reinforcing filler comprises 0 to less than 40 phr, preferably 0 to less than 30 phr, more preferably 0 to less than 20 phr, still more preferably 0 to less than 10 phr, particularly 0 to less than 5 phr, more particularly 0 to 3 phr, still more particularly 0 phr, of carbon black, which means the reinforcing filler comprises no carbon black or comprises less than 40 phr, preferably less than 30 phr, more preferably less than 20 phr, still more preferably less than 10 phr, particularly less than 5 phr, more particularly at most 3 phr.

Within the ranges indicated, there is a benefit of coloring properties (black pig-mentation agent) and anti-UV properties of carbon blacks, without furthermore adversely affecting the typical performance provided by the reinforcing inorganic filler, namely high grip on wet, snowy and icy grounds.

According to a preferred embodiment of the invention, in the second rubber composition (SC), the reinforcing filler may comprise no carbon black.

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

in which:
x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

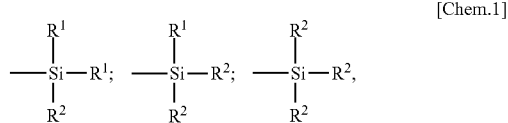

[Chem.1]

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3 Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane poly-sulphide, of bifunctional POSs (polyorganosiloxanes) or of hydroxysilane polysulphides ($R^2$=OH in the above formula (I)), such as described in patent applications WO 02/30939 (or U.S. Pat. No. 6,774, 255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to a preferred embodiment of the invention, the content of coupling agent may be from 0.5 to 15% by weight per 100% by weight of the reinforcing inorganic filler, particularly silica.

According to a preferred embodiment of the invention, the second rubber composition (SC) may be based on less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr) of coupling agent.

The second rubber composition (SC) is based on more than 45 phr (for instance, between 45 and 105 phr) of a plasticizing agent.

The plasticizing agent may comprise a hydrocarbon resin(s), a liquid plasticizer(s) or the mixtures thereof.

A ninth aspect of the invention is the tire according to any one of the first to the eighth aspects, wherein the second rubber composition (SC) is based on more than 50 phr (for example, between 50 and 100 phr), preferably more than 55 phr (for example, between 55 and 95 phr), more preferably more than 60 phr (for example, between 60 and 90 phr), still more than 65 phr (for example, between 65 and 85 phr), particularly at least 70 phr (for example, from 70 to 80 phr), of the plasticizing agent.

In the second rubber composition (SC), the plasticizing agent predominately comprises at least one hydrocarbon resin having a glass transition temperature of more than 20° C., that is, the plasticizing agent comprises more than 50% (for example, more than 50% and up to 100%) by weight of the hydrocarbon resin(s) per 100% by weight of the plasticizing agent.

A tenth aspect of the invention is the tire according to any one of the first to the ninth aspects, wherein the second rubber composition (SC) is such that the plasticizing agent comprises more than 55% (for example, between 55 and 100%), preferably more than 60% (for example, between 60 and 95%), more preferably more than 65% (for example, between 65% and 90%), still preferably at least 70% (for example, 70 to 85%), by weight of the hydrocarbon resin per 100% by weight of the plasticizing agent.

An eleventh aspect of the invention is the tire according to any one of the first to the tenth aspects, wherein the second rubber composition (SC) is such that the plasticizing agent comprises more than 25 phr (for example, between 25 and 85 phr), preferably more than 30 phr (for example, between 30 and 80 phr), more preferably more than 35 phr (for example, between 35 and 75 phr), still more preferably more than 40 phr (for example, between 40 and 70 phr), particularly at least 45 phr (for example, 45 to 65 phr), more particularly at least 50 phr (for example, 50 to 60 phr), of the hydrocarbon resin.

In a manner known to a person skilled in the art, the designation "resin" is reserved in the present application, by definition, for a compound which is solid at ambient temperature (20° C. under atmosphere pressure), in contrast to a liquid plasticizing compound, such as an oil.

The hydrocarbon resin(s) are polymer well known by a person skilled in the art, which are essentially based on carbon and hydrogen, and thus miscible by nature in rubber composition(s), for instance diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resin(s) as being "plasticizing" exhibit at least one, more preferably all, of the following characteristics:
  a $Tg_{DSC}$ of above 20° C. (for example, between 20° C. and 100° C.), preferably above 30° C. (for example, between 30° C. and 100° C.), more preferably above 40° C. (for example, between 40° C. and 100° C.), still more preferably above 45° C. (for example, between 45° C. and 100° C.), particularly at least 50° C. (for example, at least 50° C. and less than 100° C.)
  a number-average molecular weight (Mn) of between 400 and 2000 g/mol (more preferably between 500 and 1500 g/mol);
  a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/1; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

A twelfth aspect of the invention is the tire according to any one of the first to the eleventh aspects, wherein the hydrocarbon resin is selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinyl-benzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:
  polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);
  $C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";
  limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modifieda-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

A thirteenth aspect of the invention is the tire according to any one of the first to the twelfth aspects, wherein the second rubber composition (SC) is such that the plasticizing agent comprises less than 45 phr (for example, between 1 and 45 phr), preferably less than 35 phr (for example, between 2 and 35 phr), more preferably less than 30 phr (for example, between 3 and 30 phr), still more preferably less than 25 phr (for example, between 5 and 25 phr), particularly between 10 and 25 phr, of at least one liquid plasticizer.

The liquid plasticizer is liquid at 20° C. (under atmospheric pressure) by definition, their role is to soften the matrix by diluting the elastomer and the reinforcing filler; their $Tg_{DSC}$ is by definition less than −20° C. (for example, between −120 and −30° C.), preferably less than −30° C. (for example, between −100 and −30° C.), more preferably less than −40° C. (for example, between −80 and −40° C.), still more preferably less than −50° C. (for example, between −70 and −50° C.), particularly at most −55° C. (for example, from −55 to −65° C.).

Any extending oil, whether of aromatic or non-aromatic nature, any liquid plasticizing agent known for its plasticizing properties with regard to elastomer matrix(es), for instance, diene elastomers, can be used. At ambient temperature (20° C.), these plasticizers or these oils, which are more or less viscous, are liquids (that is to say, as a reminder, substances that have the ability to eventually take on the shape of their container), as opposed, in particular, to plasticizing hydrocarbon resins which are by nature solid at ambient temperature.

A fourteenth aspect of the invention is the tire according to the thirteenth aspect, wherein the second rubber composition (SC) is such that the liquid plasticizer is selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof.

Mention may be made, as phosphate plasticizers for example, of those that contain between 12 and 30 carbon atoms, for example trioctyl phosphate. As examples of ester plasticizers, mention may especially be made of the compounds selected from the group consisting of trimellitates, pyromellitates, phthalates, 1,2-cyclohexane dicar-boxylates, adipates, azelates, sebacates, triesters of glycerol, and mixtures thereof. Among the above triesters, mention may be made of glycerol triesters, preferably composed predominantly (for more than 50% by weight, more preferably for more than 80% by weight) of an unsaturated $C_{18}$ fatty acid, that is to say an unsaturated fatty acid selected from the group consisting of oleic acid, linoleic acid, linolenic acid and the mixtures thereof. More preferably, whether of synthetic origin or natural origin (in the case, for example, of sunflower or rapeseed vegetable oils), the fatty acid used is composed for more than 50% by weight, more preferably still from 80% by weight, of oleic acid. Such triesters (trioleates) comprising a high content of oleic acid are well known; for example they have been described in Application WO 02/088238, as the liquid plasticizers in treads for tires.

If the liquid plasticizer used comprises a petroleum oil, the petroleum oil is preferably a non-aromatic petroleum oil. A liquid plasticizer is described as non-aromatic when it has a content of polycyclic aromatic compounds, determined with the extract in DMSO according to the IP 346 method, of less than 3% by weight, relative to the total weight of the plasticizer. Therefore, use may be made of a liquid plasticizer selected from the group consisting of MES oils, TDAE oils, naphthenic oils (of low or high viscosity, in particular which are hydrogenated or non-hydrogenated), paraffinic oils and the mixtures thereof. Also suitable as petroleum oils are RAE oils, TRAE oils and SRAE oils or the mixtures thereof, which contain low contents of polycyclic compounds.

The second rubber composition (SC) according to the invention may be based on all or a portion(s) of the usual additives generally used in the elastomer compositions intended for the manufacture of treads for tires, such as, for example, pigments, protection agents, such as antiozone waxes, chemical antiozonants, antioxidants, an-tifatigue agents, reinforcing resins, such as methylene acceptors (for example phenolic novolac resin) or methylene donors (for example HMT or H3M), a crosslinking system based either on sulphur or on donors of sulphur and/or peroxide and/or bismaleimides, vulcanization accelerators, or vulcanization activators.

The second rubber composition (SC) can be also based on coupling activators when a coupling agent is used, agents for covering the reinforcing inorganic filler or generally processing aids, capable, in a known way, by virtue of an improvement in the dispersion of the filler in the rubber matrix and of a lowering of the viscosity of the second rubber composition (SC), of improving their property of processing in the raw state; these agents are, for example, hydrolysable silanes, such as alkylalkoxysilanes, polyols, polyethers, amines, or hydroxylated or hydrolysable polyorganosiloxanes.

The second rubber composition (SC) according to the invention are manufactured in appropriate mixers using two successive preparation phases according to a general procedure well known to a person skilled in the art: a first phase of thermomechanical working or kneading (referred to a as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of the second rubber composition (SC) comprises, for example and preferably, the following steps:

incorporating in the elastomer matrix, for instance, the diene elastomer(s), in a mixer, the reinforcing filler, the plasticizing agent, during a first stage ("non productive" stage) everything being kneaded thermomechanically, in one or more goes, until a maximum temperature of between 110° C. and 190° C. is reached;

cooling the combined mixture to a temperature of less than 100° C.;

subsequently incorporating, during a second stage ("productive" stage), a crosslinking system;

kneading everything up to a maximum temperature of less than 110° C.

By way of example, the first (non-productive) phase is carried out in a single thermomechanical stage during which all the necessary constituents are introduced into an appropriate mixer, such as a standard internal mixer, followed, in the second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; The combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase.

The content of sulphur is preferably between 0.5 and 5.0 phr, and that of the primary accelerator is preferably between 0.5 and 8.0 phr.

Use may be made, as accelerator (primary or secondary) of any compound capable of acting as accelerator of the vulcanization of elastomer matrix, for instance, diene elastomers in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cy-clohexyl-2-benzothiazole sulphenamide (abbreviated to "CBS"), N,N-dicyclohexyl-2 benzothiazole-sulphenamide ("DCBS"), N-tert-butyl-2-benzothiazolesulphenamide ("TBBS"), N-tert-butyl-2 benzothiazolesulphenimide ("TBSI"), zinc dibenzyldithio-carbamate ("ZBEC"), Tetrabenzylthiuram disulfide ("TBZTD") and the mixtures thereof.

The second rubber composition (SC) thus obtained is subsequently calendered, for example in the form of a sheet or of a plaque, in particular for laboratory charac-terization, or else extruded in the form of a rubber profiled element which can be used directly the covering layer as portion(s) of the tread pattern elements (1) of the tread of the tire according to the present invention.

The vulcanization (or curing) is carried out in a known way at a temperature generally of between 110° C. and 190° C. for a sufficient time which can vary, for example, between 5 and 90 min depending in particular on the curing temperature, the adopted vulcanization system and the vulcanization kinetics of the second rubber composition (SC) under consideration.

A first step in a manufacture of the tread of the tire according to the present invention is to cover the first rubber composition (FC) with the layer of the second rubber composition (SC).

For example, the first step can be done with a method described in the aforementioned application WO 2013/087878, namely by impregnating a two-dimensional fiber assembly such a fabric or non-woven, or a three-dimensional fiber assembly as a felt, previously placed in the appropriate dimensions, with the second rubber composition (SC). This impregnation can be done for example by hot calendering, by press molding or by injection under pressure.

The presence of the fiber assembly impregnated with the second rubber composition (SC), allows to obtain an excellent cohesion of the layer of the second rubber composition (SC) before vulcanization of the tire and thus assist the layer of the second rubber composition (SC) to place on the first rubber composition (FC) during molding of the tire.

Of course, means other than the fiber assembly could be used to improve the cohesion and the placement of the layer of the second rubber composition (SC) in the raw state, such as a rigid metal sheet, cellulose fiber (for instance, paper, cardboard) or another polymer.

Of course, if such a fiber assembly, strip or other means, is used to help the laying of the second rubber composition (SC) to place on the first rubber composition (FC) during the manufacture of the tire according to the present invention, the second rubber composition (SC) can comprise the fiber assembly, the strip or the other means unless the fiber assembly, the strip or the other means is extracted before the curing of the tire.

Preferably, the fibers used are long fibers having a longest dimension of greater than 30 mm, more preferably of greater than 50 mm.

Any type of fibers, preferably fibers selected from the group consisting of textile fiber, mineral fiber and the mixtures thereof, can be used to the layer of the second rubber composition (SC) with sufficient tensile rigidity to facilitate the placement of layer of the second rubber composition (SC) during molding of the tire.

The textile fiber may be selected from the group consisting of natural origin fibers, synthetic fibers and the mixtures thereof. The natural origin fibers may be made an organic material selected from the group consisting of silk, cotton, bamboo, cellulose, wool and the mixtures thereof, preferably cotton, cellulose, wood and the mixtures thereof. The synthetic fibers may be made of a synthetic material selected from the group consisting of polyester, polyamide, carbon, aramid, polyethylene, polypropylene, polyacrylonitrile, polyimide, polysulfone, polyether sulfone, polyurethane, polyvinyl alcohol and the mixtures thereof.

The mineral fiber may be selected from the group consisting of glass fibers, basalt fiber and the mixtures thereof.

Then, one way of obtaining such a tread pattern is for example to cover the entirety of a green form of a tread comprising the first rubber composition (FC) with the layer of the second rubber composition (SC) of suitable thickness before molding the tread and the cut-outs (3, 4). After molding, the second rubber composition (SC) on the contact surface (2) can be left in place or alternatively eliminated by a mechanical means (notably by grinding).

Another way of industrially producing a tread of a tire according to the present invention may consist in applying, to the unvulcanized green form of the tire provided with a tread made of the first rubber composition (FC), thin strips of the second rubber composition (SC), as described in patent EP 0510550 (it is possible for the thin strips to be applied to the tread in the circumferential and/or axial direction(s)). Another way may consist in producing the tread by coextruding two (or more) compounds when the tread is extruded. It is still possible to operate as described in FIGS. 5-6 and paragraph IV-B of WO2013/087878.

After vulcanization of the tire of the invention, the specific layer of the second rubber composition (SC) described above has the advantage of providing a very suitable stiffness to the edges (23, 24, 25, 26) formed by the intersection of the contact surfaces (2) and the suitable rigidity lateral faces (13, 14, 15, 16), which is particularly favorable behavior of the tire on snowy ground, while giving the tire, thanks to the presence of the specific second rubber composition capable of improving grip performance of the tire on wet ground, while maintaining or improving the grip per-formances on snowy and icy grounds.

A fifteenth aspect of the invention is the tire according to any one of the first to the fourteenth aspects, wherein the layer of the second rubber composition (SC) has a thickness (E1) which is more than 0.1 mm (for example, between 0.1 and 5.0 mm), preferably more than 0.2 mm (for example, between 0.2 and 4.5 mm) in order to get excellent grip on snow ground. More preferably, the thickness is between 0.2 and 4.0 mm, still more preferably between 0.3 and 1.0 mm in order to maintain an excellent behavior on snowy ground while at the same time limiting the extent to which grip on icy ground is penalized.

The invention is further illustrated by the following non-limiting examples.

EXAMPLES

In the following tests, six tires (identified as T-0 (a reference), T-1 (a comparative example), T-2, T-3, T-4 and T-5 (examples according to the invention)) having a dimension 225/45R17 (load index: 94) are compared. Each of tires comprises a tread which comprises a tread pattern element comprising a conventional rubber composition (as the first rubber composition (FC)). Each first rubber composition (FC) is covered with a layer of each second composition (identified as C-0, C-1, C-2, C-3, C-4 and C-5) which is based on a diene elastomer (a styrene-butadiene copolymer, SBR), is reinforced with a silica (as a reinforcing inorganic filler), and comprises a plasticizing agent comprising a hydrocarbon resin and also a liquid plasticizer. Their formulations are given at Table 1 with the content of the various products expressed in phr.

The reinforcing filler, its associated coupling agent, the plasticizing agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the mea-surement of their physical or mechanical properties, or in the form of profiled elements which could be used directly, after cutting and/or assembling to the desired dimensions, for example as tire semi-finished products.

The six tires (T-0 to T-5) conventionally manufactured with a curing condition (typically, temperature: 160° C., pressure: 16 bar, and time: several tens of minutes) are identical in all points except for C-0 to C-3 as the second rubber compositions (SC) constituting the treads. The layers of the second rubber compositions (SC), which are applied to the first rubber composition (FC) as described in patent EP 050550, have a thickness (E1: 0.8 mm) on the circumferential direction of the tires, the height ($H_R$) of layers is at least 70% of the height (H) of axial grooves (4) of the tires on the radial direction of the tires. The average height ($H_R$) of layers is about 6.3 mm. The maximum of height (H) of axial grooves (4) is about 9.0 mm. The tires adopt substantially the structure described with the support of FIGS. 1 and 2.

The properties of test tires (T-0 to T-5) obtained from grip measurements on arbitrary suitable wet/snow/ice conditions described in detail below are given in Table 2, a value greater than that of the reference (T-0), arbitrarily set at 100, indicating an improved result, i.e. an aptitude for a shorter braking distance.

The wet grip measurements were conducted on the test tires mounted on a trailer towed by a vehicle at wet surface temperature of 10° C. Each of the measurements was in accordance with "UN/ECE (United Nations Economic Commission for Europe) Regulation No. 117 revision 4 concerning the approval of tyres with regard to rolling sound emissions and/or to adhesion on wet surfaces and/or to rolling resistance", that is, on a straight path 1 mm deep wet surface, braking force was applied to each of the test tires at speed of 65 km/h, and then peak μ level was calculated.

As the snow grip measurements, a 1,400 cc passenger car provided on all the four wheels with the same kind of test tires under 220 kPa of tire inflation pressure mounted onto 7.5 J×17 rim was run on a snow covered road at a temperature of about −10° C., and the deceleration from 50 to 5 km/h during sudden longitudinal braking while anti-lock braking system (ABS) activated was respectively measured. The above snow tests were conducted on a hard pack snow with a CTI penetrometer reading of about 86 in accordance with Standard ASTM F1805.

As the ice grip measurements, the above passenger car with the above test tires under the above tire inflation pressure mounted onto the above rim was run on an ice covered road at the road's temperature of −10° C., and the braking distance from 20 to 5 km/h during sudden longitudinal braking while anti-lock braking system (ABS) activated was measured.

As an examination of the results in Table 2, the test tires according to the invention T-2 to T-5 compared with the reference T-0 and the comparative example T-1 exhibit markedly improved wet grip. Moreover, the test tires according to the invention T-2 and T-3, reveals equivalent or improved snow and ice grips to that of the reference T-0 and the comparative example T-1.

In conclusion, the tire comprising the tread which comprises the tread pattern elements respectively comprising the first rubber composition (FC) covered on the lateral face(s) with the specific second rubber composition (SC) according to the present invention make possible an improvement of grip on wet ground, while maintaining or improving the grips on snowy and icy ground.

TABLE 1

|  | C-0 | C-1 | C-2 | C-3 | C-4 | C-5 |
| --- | --- | --- | --- | --- | --- | --- |
| SBR 1 (1) | 100 |  |  |  |  |  |
| SBR 2 (2) |  | 100 |  |  |  |  |
| SBR 3 (3) |  |  | 100 | 100 | 100 | 100 |
| Silica (4) | 120 | 120 | 120 | 120 | 120 | 120 |
| Coupling agent (5) | 9.6 | 9.6 | 9.6 | 9.6 | 9.6 | 9.6 |
| Hydrocarbon resin (6) | 20 | 40 | 40 | 40 | 55 | 65 |
| Liquid plasticizer 1 (7) | 45 | 25 | 25 |  |  |  |
| Liquid plasticizer 2 (8) |  |  |  | 25 | 20 | 10 |
| Steric acid | 1 | 1 | 1 | 1 | 1 | 1 |
| Anti-ozone wax | 1.5 | 1.5 | 1.5 | 1.5 | 1.5 | 1.5 |
| Anti-oxidant (9) | 2 | 2 | 2 | 2 | 2 | 2 |
| DPG (10) | 3 | 3 | 3 | 3 | 3 | 3 |
| ZnO | 2.5 | 2.5 | 2.5 | 2.5 | 2.5 | 2.5 |
| Accelerator (11) | 2 | 2 | 2 | 2 | 2 | 2 |
| Sulphur | 1.7 | 1.7 | 1.7 | 1.7 | 1.7 | 1.7 |

(1) SBR1: solution SBR with 44% of styrene units, 41% of 1,2-unit of the butadiene parts, and 23% of cis-1,4 unit of butadiene parts ($Tg_{DSC}$ = −12° C.);
(2) SBR2: solution SBR with 41% of styrene units, 24% of 1,2-unit of the butadiene parts, and 26% of cis-1,4 unit of butadiene parts ($Tg_{DSC}$ = −25° C.);
(3) SBR3: solution SBR with 16% of styrene units, 24% of 1,2-unit of the butadiene parts, and 30% of cis-1,4 unit of butadiene parts ($Tg_{DSC}$ = −65° C.);
(4) Silica: Silica ("Zeosil 1165MP" from Rhodia (CTAB, BET: about 160 m$^2$/g));
(5) Coupling agent TESPT ("Si69" from Evonik);
(6) Cycloaliphatic hydrocarbon resins (ESCOREZ5600, Exxon mobil, $Tg_{DSC}$ = 52° C.);
(7) TDAE oil ("Vivatec 500" from the Hansen & Rosenthal company);
(8) MES oil ("Catenex SNR" from Shell);
(9) N-(1,3-dimethylbutyl)-N-phenyl-para-phenylenediamine ("Santoflex 6-PPD" from Flexsys);
(10) Diphenylguanidine ("Perkacit DPG" from Flexsys);
(11) N-dicyclohexyl-2-benzothiazolesulphenamide ("Santocure CBS" from Flexsys).

TABLE 2

|  | T-0 | T-1 | T-2 | T-3 | T-4 | T-5 |
| --- | --- | --- | --- | --- | --- | --- |
| Wet grip | 100 | 103 | 115 | 115 | 129 | 124 |
| Snow grip | 100 | 100 | 100 | 100 | 100 | 101 |
| Ice grip | 100 | 95 | 100 | 103 | 115 | 113 |
| Average performance | 100 | 100 | 105 | 106 | 115 | 113 |

The invention claimed is:

1. A tire comprising a tread which comprises a plurality of tread pattern elements delimited by cut-outs, the tread pattern elements respectively comprising at least one lateral face and a contact surface intended to come into contact with the ground during rolling, and the tread pattern elements respectively comprising a first rubber composition at least partially covered on at least one of the lateral face with a layer of a second rubber composition which is different from the first rubber composition, wherein the second rubber composition consists of:
an elastomer matrix comprising 55 phr to 100 phr of a first diene elastomer being a styrene-butadiene copolymer and having a glass transition temperature of less than −60° C., and 0 to less than 45 phr of a second diene elastomer;
a reinforcing filler comprising more than 100 phr of a reinforcing inorganic filler;
a coupling agent;
more than 45 phr of a plasticizing agent consisting of at least one liquid plasticizer and at least one hydrocarbon resin having a glass transition temperature of more than 20° C;
a crosslinking system; and
at least one additive selected from the group consisting of a pigment, a protection agent, a chemical antiozonant, an antioxidant, an antifatigue agents, and a reinforcing resin.

2. The tire according to claim 1, wherein the reinforcing inorganic filler predominantly comprises silica.

3. The tire according to claim 1, wherein the reinforcing filler comprises 0 to less than 40 phr of carbon black.

4. The tire according to claim 1, wherein the at least one hydrocarbon resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, alpha-methyl styrene homopolymer or copolymer resins, and mixtures thereof.

5. The tire according to claim 1, wherein the at least one liquid plasticizer is selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and mixtures thereof.

6. The tire according to claim 1, wherein the layer of the second rubber composition has a thickness which is more than 0.1 mm.

7. The tire according to claim 1, wherein the layer of the second rubber composition covers on the lateral face which has an orientation which is perpendicular to the circumferential direction of the tire.

8. The tire according to claim 1, wherein the second rubber composition extends, in a new condition of the tire, as far as an edge corner formed by a boundary between the contact surface and the lateral face of the tread pattern elements.

9. The tire according to claim 1, wherein the styrene-butadiene copolymer exhibits a styrene unit of less than 28% by weight per 100% by weight of the styrene-butadiene copolymer.

10. The tire according to claim 1, wherein the elastomer matrix comprises 80 to 100 phr of the first diene elastomer, and 0 to 20 phr of the second diene elastomer.

11. The tire according to claim 10, wherein the elastomer matrix comprises 90 to 100 phr of the first diene elastomer, and 0 to 10 phr of the second diene elastomer.

12. The tire according to claim 11, wherein the elastomer matrix comprises 100 phr of the first diene elastomer.

13. The tire according to claim 1, wherein the reinforcing filler comprises at least 110 phr of the reinforcing inorganic filler.

14. The tire according to claim 1, wherein the second rubber composition is based on more than 50 phr of the plasticizing agent.

15. The tire according to claim 1, wherein the plasticizing agent comprises more than 55% by weight of the at least one hydrocarbon resin per 100% by weight of the plasticizing agent.

16. The tire according to claim 1, wherein the plasticizing agent comprises more than 25 phr of the at least one hydrocarbon resin.

* * * * *